United States Patent
Yamamoto et al.

(10) Patent No.: US 7,763,216 B2
(45) Date of Patent: Jul. 27, 2010

(54) CHEMICAL REACTOR AND FUEL CELL SYSTEM

(75) Inventors: Tadao Yamamoto, Tokyo (JP); Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 218 days.

(21) Appl. No.: 12/001,325

(22) Filed: Dec. 11, 2007

(65) Prior Publication Data
US 2008/0112860 A1    May 15, 2008

Related U.S. Application Data

(63) Continuation of application No. 10/500,017, filed as application No. PCT/JP03/13064 on Oct. 10, 2003, now abandoned.

(30) Foreign Application Priority Data
Oct. 25, 2002    (JP) .............................. 2002-310959

(51) Int. Cl.
B01J 8/04    (2006.01)
(52) U.S. Cl. ..................................... 422/189; 422/198
(58) Field of Classification Search ................ 422/187, 422/188, 189, 190, 191, 193, 196, 197, 198, 422/200, 648.1; 423/648.1
See application file for complete search history.

(56) References Cited

U.S. PATENT DOCUMENTS

| | | |
|---|---|---|
| 6,200,536 B1 | 3/2001 | Tonkovich et al. |
| 6,277,339 B1 | 8/2001 | Boneberg et al. |
| 6,428,758 B1 | 8/2002 | Schuessler et al. |
| 6,447,736 B1 | 9/2002 | Autenrieth et al. |
| 7,014,835 B2 * | 3/2006 | Mathias et al. .............. 422/198 |

FOREIGN PATENT DOCUMENTS

| | | |
|---|---|---|
| JP | 06-111838 A | 4/1994 |
| JP | 06111838 A * | 4/1994 |
| JP | 09-094086 A | 4/1997 |
| JP | 3114097 B2 | 9/2000 |
| JP | 2001-524019 A | 11/2001 |
| JP | 2003-290649 A | 10/2003 |
| JP | 2004-141794 A | 5/2004 |
| JP | 2004-535347 A | 11/2004 |
| JP | 2007-268531 A | 10/2007 |
| JP | 2008-194689 A | 8/2008 |
| WO | WO 03/082460 A1 | 10/2003 |

OTHER PUBLICATIONS

Japanese Office Action dated Jun. 2, 2009 and English translation thereof issued in a counterpart Japanese Application No. 2007-118000.
Japanese Office Action dated Jun. 2, 2009 (3 pages), and English translation thereof (3 pages), issued in counterpart Japanese Application Serial No. 2002-310959.
Japanese Office Action (and English translation thereof) dated Jul. 8, 2008, issued in a counterpart Japanese Application.

* cited by examiner

Primary Examiner—Glenn Caldarola
Assistant Examiner—Randy Boyer
(74) Attorney, Agent, or Firm—Frishauf, Holtz, Goodman & Chick, P.C.

(57) ABSTRACT

A chemical reactor includes a first reaction section which has a first flow path and causes a first reaction in the first flow path. A heating section heats the first reaction section. A second reaction section has a second flow path and causes a second reaction in the second flow path by heat of the heating section transmitted via the first reaction section.

36 Claims, 12 Drawing Sheets

CHEMICAL REACTOR AND FUEL CELL SYSTEM

CROSS REFERENCE TO RELATED APPLICATIONS

The present application is a Continuation Application of U.S. application Ser. No. 10/500,017 filed Jun. 23, 2004, now abandoned which is incorporated herein by reference, which is a U.S. National Phase Application under 35 USC 371 of International Application PCT/JP03/13064 filed Oct. 10, 2003.

TECHNICAL FIELD

The present invention relates to a chemical reactor and a fuel cell system.

BACKGROUND ART

In a technical field of chemical reactions, a chemical reactor has been known wherein a fluid material flows in a flow path formed in a substrate so as to produce a desired fluid material by a chemical reaction. Some of such conventional chemical reactors are small in size and have a flow path on a micron or millimeter scale which is formed in a small-sized substrate by use of a micro fabrication technique accumulated by a semiconductor manufacturing technique for semiconductor integrated circuits or the like, and PCT National Publication No. 2001-524019 shows a chemical micro reactor with a plurality of laminated substrates in which paths for a reacting fluid are formed. Such chemical reactors promote a reaction by heating a reaction furnace, and the reaction furnace itself is small, thus offering advantages that uniform heat can be transmitted and a reaction can be uniformly induced.

In one chemical reactor which causes a plurality of reactions, suitable temperature for each reaction may differ, so that the temperature needs to be changed locally.

Therefore, according to advantages of this invention, a chemical reactor and a fuel cell system are provided which are capable of performing a plurality of chemical reactions and allow the entire reactor to be simplified and small in size.

DISCLOSURE OF INVENTION

The present invention provides a chemical reactor comprising:

a first reaction section which has a first flow path and causes a first reaction in the first flow path;

a heating section which heats the first reaction section; and a second reaction section which has a second flow path and causes a second reaction in the second flow path by heat of the heating section transmitted via the first reaction section.

The heating section may heat a plurality of reaction sections, and especially when heating a plurality of reaction sections with different suitable reaction temperatures, the heating section can heat, by heating one reaction section, heat the other reaction section via the one reaction section, thereby causing reactions in both the reaction sections at their suitable temperatures. A substrate in which the flow paths are formed to cause reactions is preferable for this kind of heat transmission, but if thermal conductivity of the substrate is too good, temperature of the heat that reaches the reaction section requiring a lower temperature might not be low enough. In such a case, it is possible to adjust the temperature by providing slits in portions of the substrate to block the heat transmission.

BEST MODE FOR CARRYING OUT THE INVENTION

Figure 1:
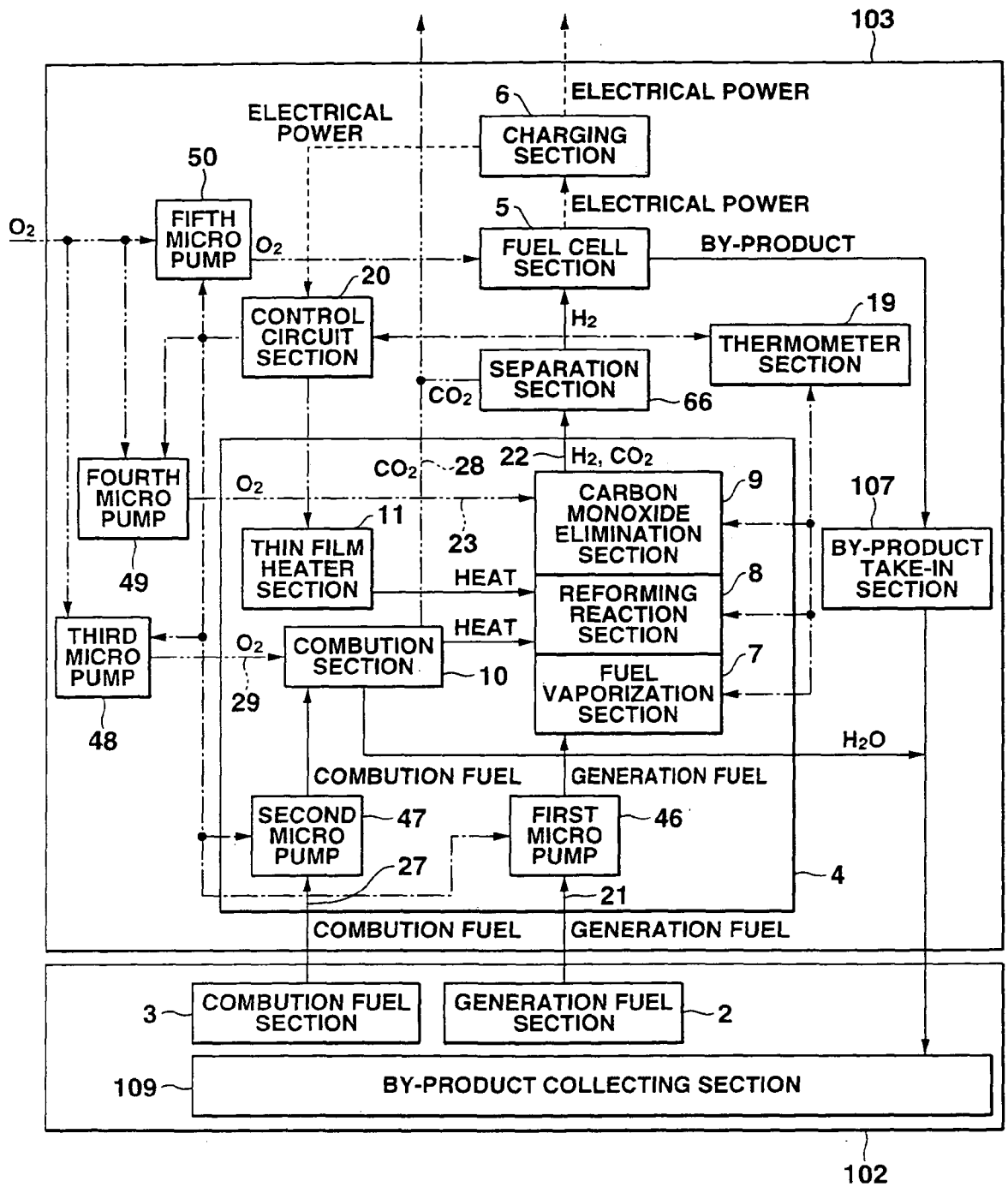
FIG. 1 is a block diagram showing essential parts of one example of a fuel cell system comprising a chemical reactor as one embodiment of this invention.

Next, a micro chemical reactor as one embodiment of this invention which is applied to a reforming reactor of a fuel reforming type fuel cell system will be described. FIG. 1 is a block diagram showing essential parts of one example of a fuel cell system 1. This fuel cell system 1 comprises a generation fuel section 2, a combustion fuel section 3, a micro chemical reactor 4, a fuel cell section 5 and a charging section 6.

The generation fuel section 2 includes a generation fuel storage container in which a generation fuel 68 (e.g., a methanol solution) is sealed, and supplies the generation fuel 68 to the micro chemical reactor 4. The combustion fuel section 3 includes a combustion fuel storage container in which a combustion fuel 69 (e.g., methanol) is sealed, and supplies the combustion fuel 69 to the micro chemical reactor 4. The micro chemical reactor 4 includes a generation fuel vaporization section 7 which vaporizes the fluid generation fuel 68, a reforming reaction section 8 which reforms the vaporized generation fuel 68, a carbon monoxide elimination section 9 which eliminates carbon monoxide contained in the reformed fluid, a combustion section 10 for heating the generation fuel vaporization section 7, the reforming reaction section 8 and the carbon monoxide elimination section 9, and a thin film heater section 11.

Figure 2:
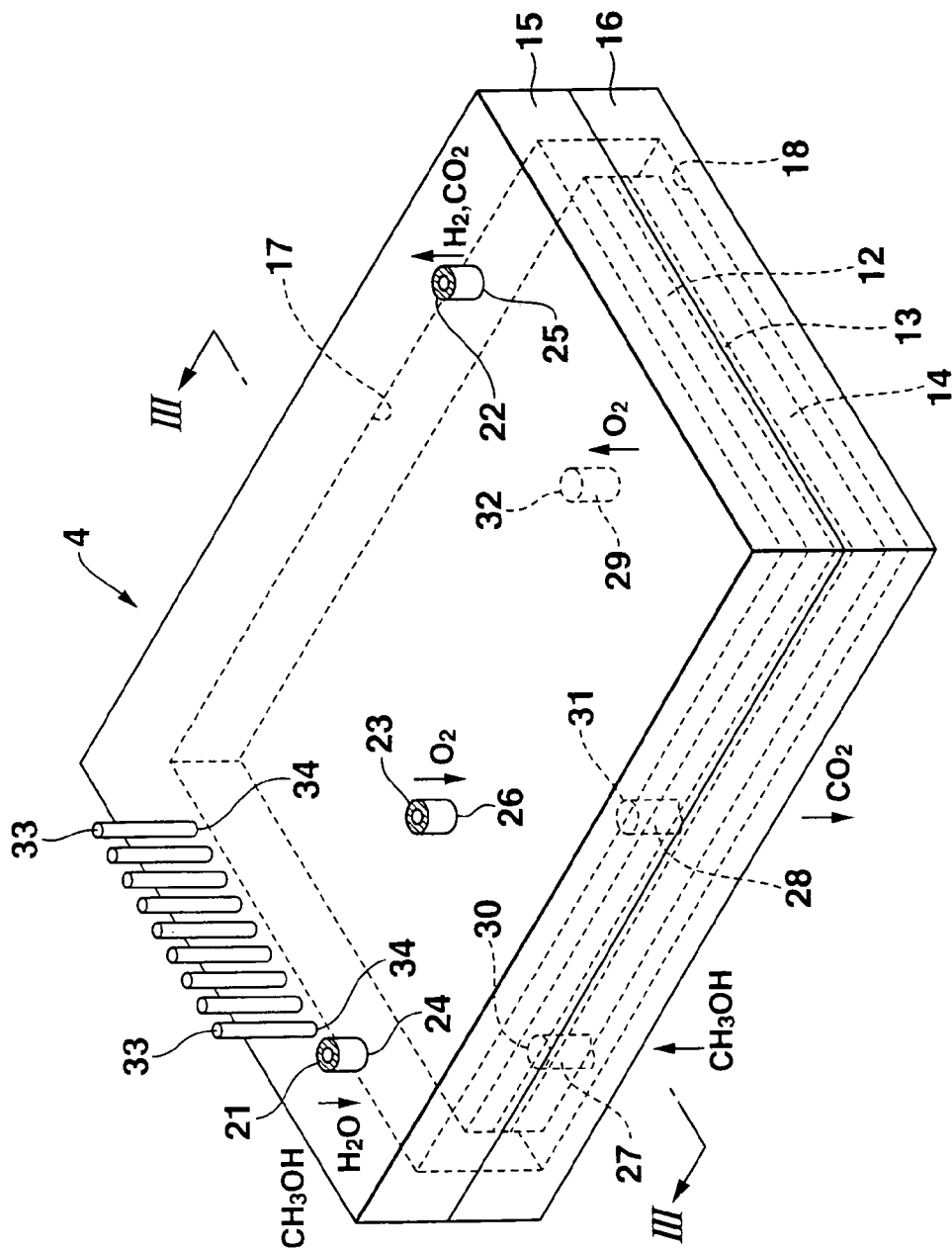
FIG. 2 is a perspective view of the essential parts of the chemical reactor shown in FIG. 1.

FIG. 2 is a perspective view of essential parts of the micro chemical reactor 4. The micro chemical reactor 4 includes a first substrate 12, a second substrate 13 and a third substrate 14 that are small-sized and laminated on each other. Three substrates 12 to 14 are accommodated in an outer package constituted of a first outer panel 15 and a second outer panel 16 that are joined to each other. In other words, concave parts 17 and 18 are formed in surfaces opposite to each other of the first and second outer panels 15 and 16, and the first to third substrates 12 to 14 are accommodated in these concave parts 17 and 18. Glass is one example for a material of the first to third substrates 12 to 14 and of the first and second outer panels 15 and 16, but silicon, ceramic, metal simple substance (e.g., aluminum), metal alloys, metallic compounds and the like which have excellent workability may be used for the first substrate 12 and the third substrate 14 in which after-mentioned flow paths are formed.

At three predetermined portions of the first outer panel 15, round through-holes 24, 25 and 26 are formed into which first end portions of a generation fuel supply tubule 21, a generation product discharge tubule 22 and an oxygen supply tubule 23 are inserted. At three predetermined portions of the second outer panel 16, round through-holes 30, 31 and 32 are formed into which first end portions of a combustion fuel supply tubule 27, a combustion gas discharge tubule 28 and an oxygen supply tubule 29 are inserted. At predetermined portions of the first outer panel 15, a plurality of round through-holes 34 are formed into which first end portions of a plurality of electrodes 33 are inserted. The plurality of electrodes 33 function as a signal wire group for electrically controlling the thin film heater or the heater section 11, which heats the generation fuel vaporization section 7 and the reforming reaction section 8 of the micro chemical reactor 4 described later, and for electrically controlling a first micro pump 46 (see FIG. 1), and also function as wires for sending and receiving signals including temperature data detected by a thermometer section 19 which detects temperature in the micro chemical reactor 4.

Figure 3:
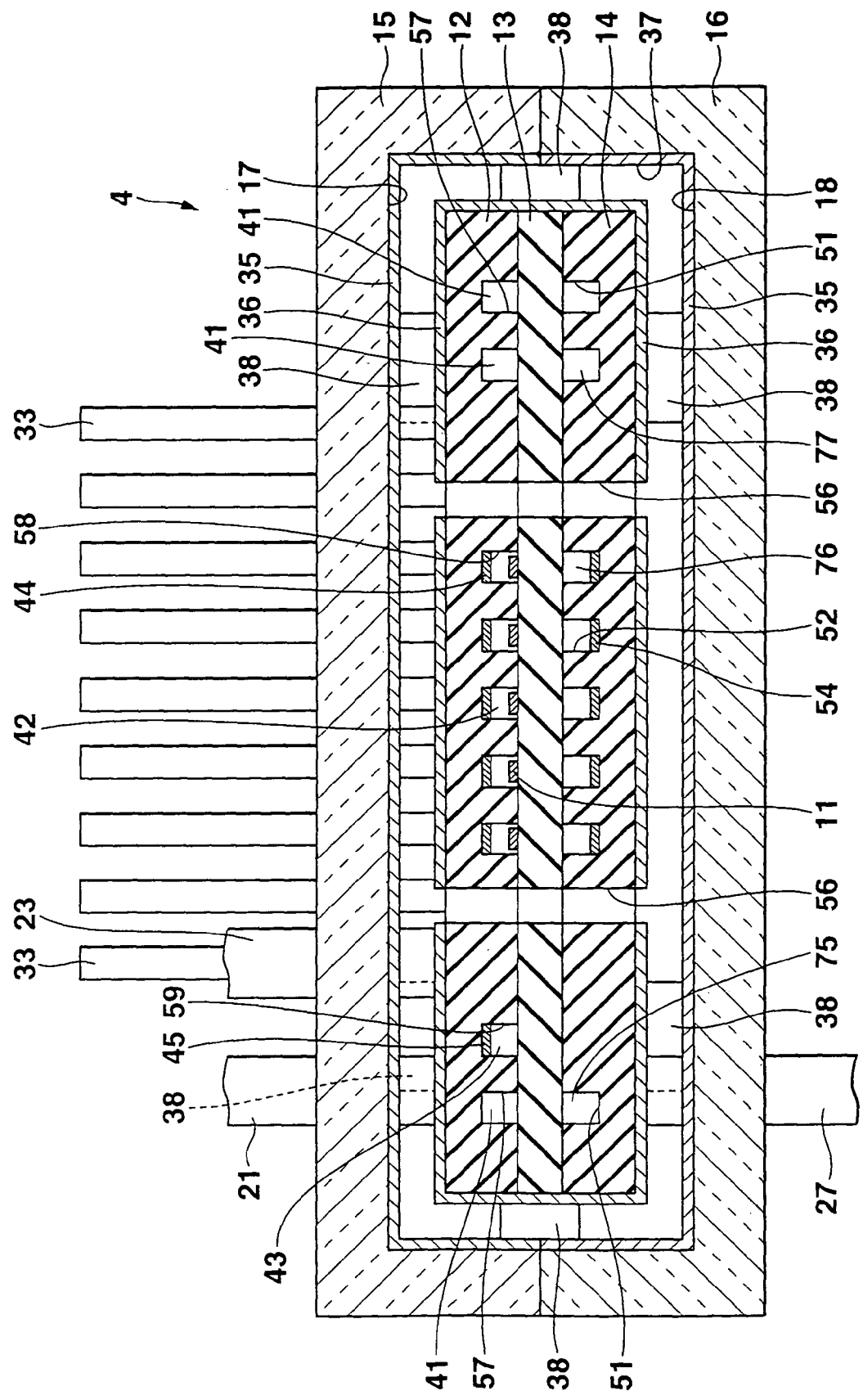
FIG. 3 is a cross sectional view along the line III-III of FIG. 2.
Figure 4:
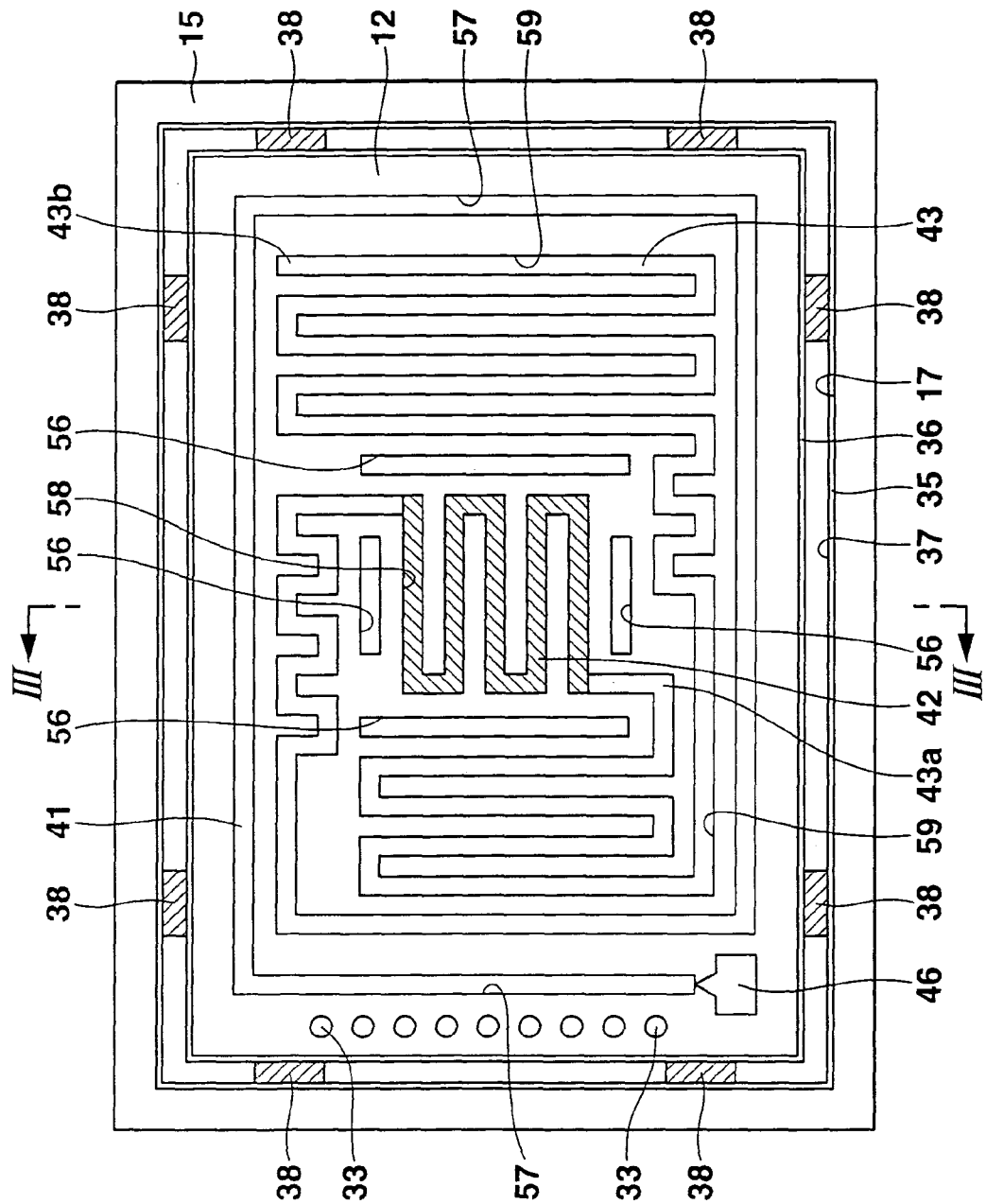
FIG. 4 is a transmitted plan view of a part corresponding to a first substrate shown in FIG. 3.
Figure 5:
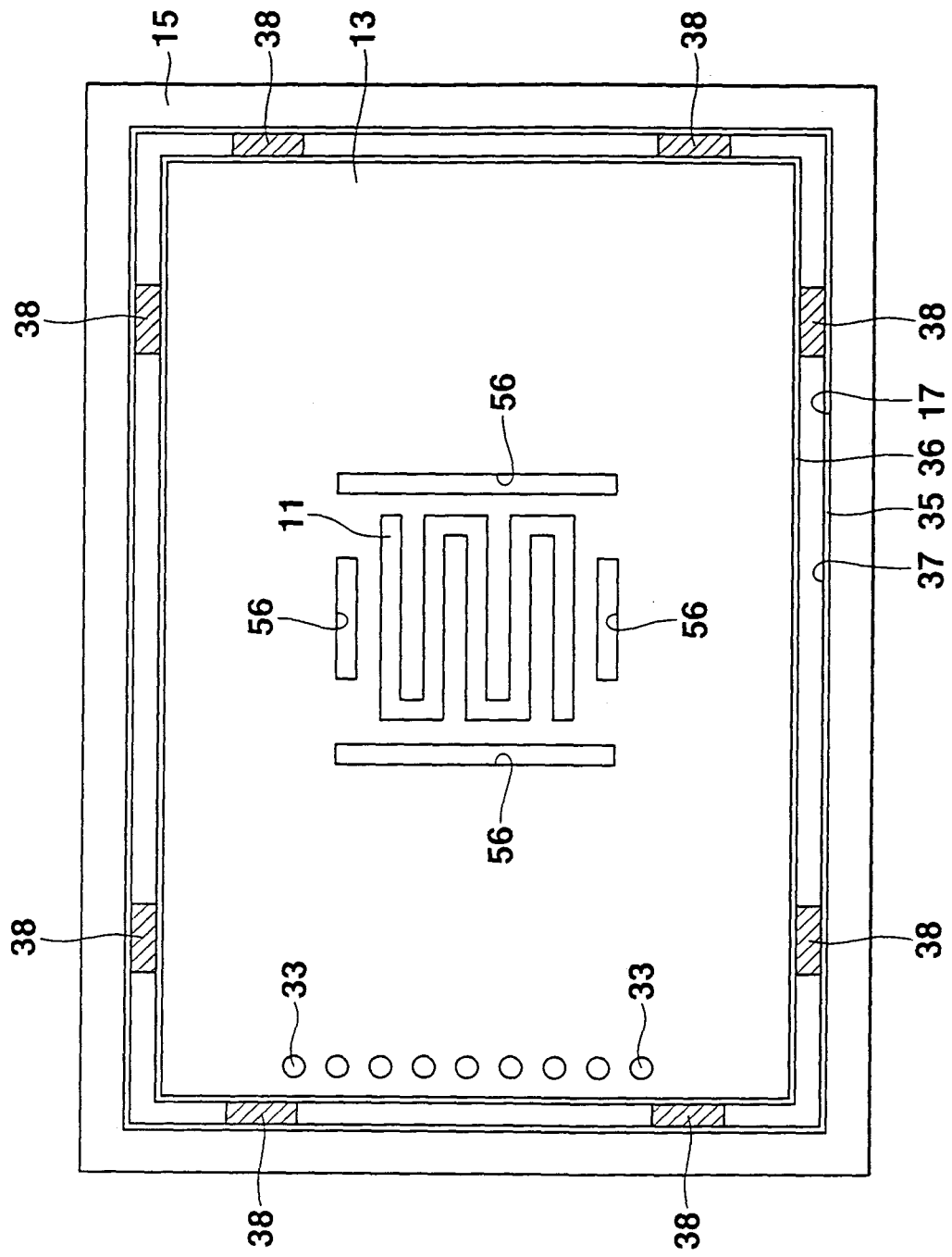
FIG. 5 is a transmitted plan view of a part corresponding to a second substrate shown in FIG. 3.
Figure 6:
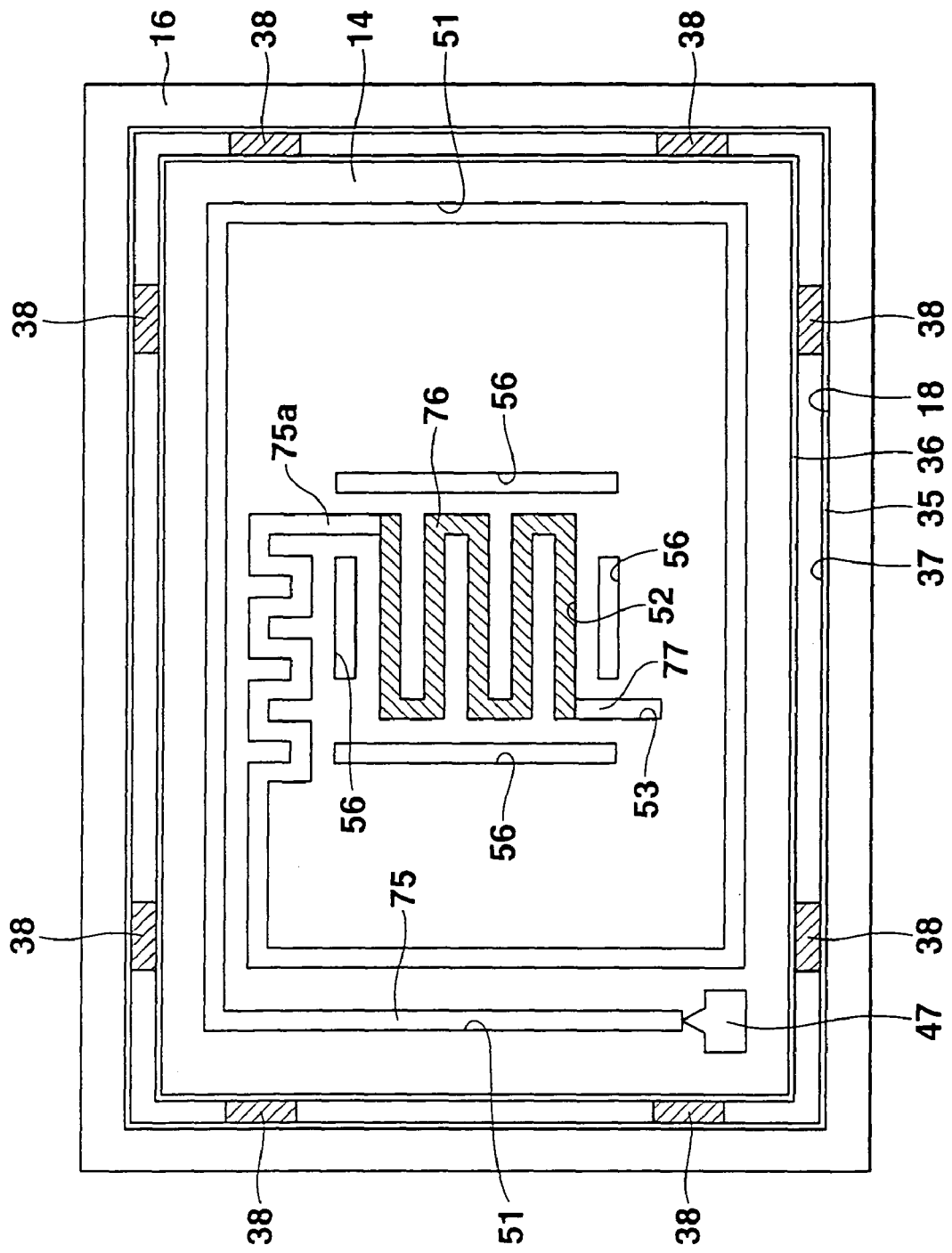
FIG. 6 is a transmitted plan view of a part corresponding to a third substrate shown in FIG. 3.

FIG. 3 is a cross sectional view along the line III-III of FIG. 2 and the line III-III of FIG. 4. FIG. 4 is a transmitted plan view of a part corresponding to the first substrate 12, FIG. 5 is a transmitted plan view of a part corresponding to the second substrate 13; and FIG. 6 is a transmitted plan view of a part corresponding to a third substrate 14. On inner wall surfaces of the concave part 17 of the first outer panel 15 and the concave part 18 of the second outer panel 16, heat radiation prevention films 35, which are formed of a metal such as Au, Ag or Al with high heat ray reflectivity, are provided except for portions corresponding to the round transmitting holes 24, 25, 26, 30, 31, 32 and 34 shown in FIG. 2.

On outermost surfaces of the first to third substrates 12 to 14, that is, on an upper surface (surface opposite to a side facing the second substrate 13) and side surfaces of the first substrate 12, side surfaces of the second substrate 13, and a lower surface (surface opposite to a side facing the second substrate 13) and side surfaces of the third substrate 14, a heat generation prevention film 36 formed of the same material as above is provided except for the portions corresponding to the round transmitting holes 24, 25, 26, 30, 31, 32 and 34 shown in FIG. 2 and except for portions corresponding to slits 56 described later.

A space or clearance 37 is provided between the heat generation or release prevention film 36 laid on the outermost surfaces of the first to third substrates 12 to 14 and the heat generation prevention films 35 laid on the inner surfaces of the first and second outer panels 15 and 16 so that the least heat released from the first to third substrates 12 to 14 is transmitted to the first and second outer panels 15 and 16. At a plurality of predetermined portions of the space 37, a plurality of pressure resistant spacers 38 is provided to hold the first to third substrates 12 to 14 and to maintain the width of the aperture 37. Two of the plurality of pressure resistant spacers 38 are provided for each surface of the first to third substrates 12 to 14.

The aperture 37 inhibits the heat generated as described later in the first to third substrates 12 to 14 from being released into the atmosphere, and a vacuum is formed in the aperture 37 or a gas with low thermal conductivity (such as atmospheric air, carbon dioxide gas or chlorofluorocarbon) fills the aperture 37. The heat release prevention films 35 and 36 inhibit heat generation from the outermost surfaces of the first to third substrates 12 to 14 to the outside of the first and second outer panels 15 and 16, and any one of the heat generation prevention films may be dispensed with.

As shown in FIG. 4, a vaporization flow path groove 57, a reforming flow path groove 58 and a carbon monoxide elimination flow path groove 59 are continuously formed in the inner surface of the first substrate 12. The vaporization flow path groove 57 of the first substrate 12 and an opposite surface of the second substrate 13 are combined with each other to form a vaporization flow path 41 in which the fluid generation fuel 68 flows while being vaporized. The reforming flow path groove 58 of the first substrate 12 and the opposite surface of the second substrate 13 are combined with each other to form a reforming flow path 42 in which the fluid resulting from the vaporized generation fuel 68 flows while being reformed. The carbon monoxide elimination flow path groove 59 of the first substrate 12 and the opposite surface of the second substrate 13 are combined with each other to form a carbon monoxide elimination flow path 43 in which the fluid resulting from the reformed generation fuel 68 flows while carbon monoxide contained therein is being eliminated. The vaporization flow path 41 is provided making about one round and a half from a lower left corner in a clockwise direction with a total length of 1 cm or more and 10 cm or less around a peripheral part of the inner surface (surface opposite to the second substrate 13) of the first substrate 12. The meandering reforming flow path 42 is provided continuously from the vaporization flow path 41 with a total length of 3 cm or more and 20 cm or less in a central part of the inner surface of the first substrate 12, as indicated by hatching. The suitably meandering carbon monoxide elimination flow path 43 is provided continuously from the reforming flow path 42 with a total length of 3 cm or more and 20 cm or less on the inner surface of the first substrate 12 except for the peripheral part and central part. The width and depth of the vaporization flow path 41, the reforming flow path 42 and the carbon monoxide elimination flow path 43 are both about 500 μm or less as one example. In this way, a terminal end of the vaporization flow path 41 is coupled to a starting end of the reforming flow path 42, and a terminal end of the reforming flow path 42 is coupled to a starting end of the carbon monoxide elimination flow path 43.

The vaporization flow path 41 constitutes the generation fuel vaporization section 7, which is a reaction furnace where the generation fuel 68 in liquid form is vaporized. The vaporization flow path 41 is not provided with a reaction catalyst therein. The reforming flow path 42 constitutes the reforming reaction section 8, which is a reaction furnace where the generation fuel 68 vaporized by the generation fuel vaporization section 7 is reformed. In this case, a surface of the reforming flow path groove 58 in the reforming flow path 42 is provided with a reforming catalyst layer 44 (see FIG. 3) which is formed of reforming catalyst such as Cu or ZnO, supported by a porous support film such as $Al_2O_3$. The carbon monoxide elimination flow path 43 constitutes a reaction furnace of the carbon monoxide elimination section 9, which is a reaction furnace where carbon monoxide contained in a by-product produced by the reforming reaction section 8 is eliminated. In this case, a surface of the carbon monoxide elimination flow path groove 59 in the carbon monoxide elimination flow path 43 is provided with a selective oxidative catalyst layer 45 (see FIG. 3) which is formed of reforming catalyst such as PT, supported by a porous support film such as $Al_2O_3$.

The first micro pump 46 is provided at a predetermined position in the lower left corner of the inner surface of the first substrate 12. The first micro pump 46 takes in from the generation fuel section 2 an amount of generation fuel 68 corresponding to a signal which is provided from a control circuit section 20 (see FIG. 1) in the fuel cell system 1 via the electrodes 33 or the like, and then supplies it to the starting end of the vaporization flow path 41 via the generation fuel supply tubule 21.

The first micro pump 46 may be ultra small and injects a liquid in a form of particles from a nozzle while controlling its injection amount. The first micro pump 46 is preferably, for example, an injector which heats a liquid in the nozzle so as to inject the liquid in a particle form by pressure of air bubbles in the nozzle produced by film boiling; an injector (so-called piezojet method) which injects liquid in the nozzle in the particle form by pressure waves caused in the nozzle due to deformation of an electrostriction element (piezo element); or an injector (so-called electrostatic jet method) which injects liquid in the nozzle in the particle form by vibration due to electrostatic force of a diaphragm in the nozzle. The same applies to a second micro pump 47 or the like described later.

One end of the oxygen supply tubule 23 is connected to a predetermined portion 43a in the vicinity of the starting end of the carbon monoxide elimination flow path 43. By driving a fourth micro pump 49 provided outside the micro chemical reactor 4, oxygen (air) in the atmosphere is supplied to the predetermined portion 43a in the vicinity of the starting end of the carbon monoxide elimination flow path 43 via the oxygen supply tubule 23. A third micro pump 48 controls a supply amount of oxygen in accordance with a signal provided from the control circuit section 20 in the fuel cell system 1. One end of the generation product discharge tubule 22 is connected to a predetermined portion 43b in the vicinity of the terminal end of the carbon monoxide elimination flow path 43.

As shown in FIG. 3 and FIG. 5, the thin film heater section 11 comprising a heat generation resistive element thin film such as TaSiOx or TaSiOxN which generates heat in accordance with a voltage applied by a signal from the control circuit section 20 is provided at a portion opposite to the reforming flow path 42 on a surface of the second substrate 13 opposite to the first substrate 12. The thin film heater section 11 is disposed in the reforming flow path 42, utilized as a heat source required for an initial state of a reforming reaction in the reforming flow path 42 of the reforming reaction section 8, controls temperature in the reforming flow path 42, and is also utilized as a heat source required for an initial state of chemical reactions in the vaporization flow path 41 of the generation fuel vaporization section 7 and in the carbon monoxide elimination flow path 43 of the carbon monoxide elimination section 9.

Heating in the reforming flow path 42 is achieved by heat energy mainly generated in the combustion section 10 (details of which will be described later) shown in FIG. 1. The thin film heater 11 is used secondarily. In other words, the combustion section 10 is mainly the source of heat transmitted to promote reactions in the vaporization flow path 41 of the generation fuel vaporization section 7, in the reforming flow path 42 of the reforming reaction section 8, and in the carbon monoxide elimination flow path 43 of the carbon monoxide elimination section 9. The thin film heater 11 has a fine adjusting function so that suitable temperatures are obtained in the vaporization flow path 41, the reforming flow path 42 and the carbon monoxide elimination flow path 43 in accordance with a signal provided from the control circuit section 20 in the fuel cell system 1 via the electrodes 33 or the like.

The thin film thermometer section 19 constituted by a thin film thermometer or a semiconductor thin film thermocouple is provided in the vicinity of the reforming flow path 42. The thin film thermometer section 19 detects temperature in the vaporization flow path 41 of the generation fuel vaporization section 7 heated by the combustion section 10 and the thin film heater 11, temperature in the reforming flow path 42 of the reforming reaction section 8 and temperature in the carbon monoxide elimination flow path 43 of the carbon monoxide elimination section 9, and then provides their temperature detection signals to the control circuit section 20 in the fuel cell system 1 via the electrodes 33 or the like. On the basis of these temperature detection signals, the control circuit section 20 in the fuel cell system 1 controls the heat generation of the thin film heater 11 so that suitable temperatures are obtained in the vaporization flow path 41 of the generation fuel vaporization section 7, in the reforming flow path 42 of the reforming reaction section 8 and in the carbon monoxide elimination flow path 43 of the carbon monoxide elimination section 9.

The above-mentioned thin film heater section 11 including the heat generation resistive element thin film can serve also as the accurate thermometer section 19 as long as it shows a resistance change which is linear with respect to a heating temperature t and which is large. In other words, at least two terminals connected to the electrodes 33 are set to be connected to both ends of the thin film heater section 11, and a voltage is applied across these two terminals, thereby heating the thin film heater section 11. In this case, because resistance of the thin film heater section 11 is dependent on the heating temperature, the control circuit section 20 can read a resistance change in the thin film heater section 11 by reading a change of the voltage across the two terminals via the electrodes 33. Such a configuration enables a higher density package.

Around a peripheral part of the inner surface (surface facing the second substrate 13) of the third substrate 14, a combustion fuel vaporization flow path groove 51 is continuously cut in a clockwise direction making about one round and a half in such a manner that it overlaps and extends along the reforming flow path 42 of the first substrate 12 as shown in FIG. 6. As indicated by hatching in FIG. 6, a combustion flow path groove 52 is formed meanderingly in such a manner that it overlaps and extends along the reforming flow path 42 of the first substrate 12. A linear discharge flow path groove 53 is cut at the lower left of the central part of the inner surface of the third substrate 14. A terminal end of the combustion fuel vaporization flow path groove 51 communicates with a starting end of the combustion flow path groove 52. A terminal end of the combustion flow path groove 52 communicates with a starting end of the discharge flow path groove 53. The combustion fuel vaporization flow path groove 51 of the third substrate 14 and the opposite surface of the second substrate 13 are combined with each other to form a combustion fuel vaporization flow path 75. The combustion flow path groove 52 of the third substrate 14 and the opposite surface of the second substrate 13 are combined with each other to form a combustion flow path 76. The discharge flow path groove 53 of the third substrate 14 and the opposite surface of the second substrate 13 are combined with each other to form a discharge flow path 77. In the combustion flow path 76 among the above flow paths, a combustion catalyst layer 54 (see FIG. 3) made of Pt, Au, Ag and the like is provided in the combustion flow path groove 52. The combustion flow path 76 functions as the combustion section 10. The width and depth of the combustion fuel vaporization flow path 75, the combustion flow path 76, and the discharge flow path 77 are both about 500 μm or less as one example.

The second micro pump 47 is provided at a predetermined position in the lower left corner of the inner surface of the third substrate 14. The second micro pump 47 is automatically supplied with the combustion fuel 69 from the combustion fuel section 3 via the combustion fuel supply tubule 27 by a capillary phenomenon or by driving of the second micro pump 47. The second micro pump 47 injects the combustion fuel 69 into an starting end of the combustion fuel vaporization flow path 75 while controlling its injection amount in accordance with a signal provided from the control circuit section 20 in the fuel cell system 1 via the electrodes 33 or the like.

At a predetermined portion 75a of a terminal end of the combustion fuel vaporization flow path 75, the round transmitting hole 32 is formed in the second outer panel 16 so as to communicate with one end of the oxygen supply tubule 29 shown in FIG. 2, and a through-hole is formed in the third substrate 14. By driving the third micro pump 48 provided outside the micro chemical reactor 4, oxygen (air) in the atmosphere is supplied to the predetermined portion 75a in the vicinity of the terminal end of the combustion fuel vaporization flow path 75 via the oxygen supply tubule 29. The third micro pump 48 controls a supply amount of oxygen in accordance with a signal provided from the control circuit section 20 in the fuel cell system 1. One end of the combustion gas discharge tubule 28 shown in FIG. 2 is connected to the terminal end of the discharge flow path 77. The other end of the combustion gas discharge tubule 28 communicates with the outside of the fuel cell system 1, and is open to the atmosphere.

Here, as shown in FIG. 3 to FIG. 6, the reforming flow path 42, the thin film heater 11 and the combustion flow path 76 are disposed at the same position in a planar view. The width of the thin film heater 11 is narrower than that of the reforming flow path 42 so that it can be received in the reforming flow path groove 58. In parts of the first to third substrates 12 to 14 on a periphery of an area where the reforming flow path 42, the thin film heater 11 and the combustion flow path 76 are disposed, four slits 56 are respectively formed. The slits 56 constitute a low efficiency thermal conduction section whose thermal conductivity is lower than those of the first to third substrates 12 to 14, and carry out an adjustment so that heat energy generated by the combustion section 10 and the thin film heater 11 as described later will not be excessively transmitted to the vaporization flow path 41 and the carbon monoxide elimination flow path 43 via the first to third substrates 12 to 14 to cause overheat in the vaporization flow path 41 and the carbon monoxide elimination flow path 43. The slits 56 are filled with a gas with low thermal conductivity (such as atmospheric air, carbon dioxide gas or chlorofluorocarbon) or have an atmosphere depressurized to 1 Pa or less.

Next, operation of the micro chemical reactor 4 having the above configuration will be described. First, when the combustion fuel 69 (e.g., methanol) in liquid form is supplied from the second micro pump 47 to the starting end of the combustion fuel vaporization flow path 75, heat energy due to only initial heat generation of the thin film heater 11 is transmitted to the combustion fuel vaporization flow path groove 51 via the first to third substrates 12 to 14, thereby heating the inside of the combustion fuel vaporization flow path 75 to a predetermined temperature. In the combustion fuel vaporization flow path 75, the combustion fuel 69 is heated and thus vaporized to become a combustion fuel gas (e.g., $CH_3OH$ if the combustion fuel 69 is methanol).

This produced combustion fuel gas ($CH_3OH$) is mixed with oxygen (air) supplied via the oxygen supply tubule 29 from the atmosphere at the predetermined portion 75a in the vicinity of the terminal end of the combustion fuel vaporization flow path 75. When this mixed gas ($CH_3OH+O_2$) is supplied into the combustion flow path 76 having the combustion catalyst layer 54, the supplied mixed gas is combusted on the combustion catalyst layer 54 by a combustion reaction indicated by the following equation (1), and heat energy is generated by this combustion.

$$CH_3OH+(3/2)O_2 \rightarrow CO_2+2H_2O \qquad (1)$$

This heat energy mainly heats the inside of the reforming flow path 42, and is then transmitted to the first to third substrates 12 to 14, and heats the inside of the carbon monoxide elimination flow path 43 of the carbon monoxide elimination section 9 and the inside of the vaporization flow path 41 of the generation fuel vaporization section 7. After that, the thin film heater 11 stops or reduces only the initial heat generation, and the subsequent heat generation is controlled by the control circuit section 20 in the fuel cell system 1 in accordance with the temperature detection signal of the thermometer section 19. On the other hand, the combustion gas ($CO_2$) on a right side of the above equation (1) is released into the atmosphere via the discharge flow path 77 and the combustion gas discharge tubule 28. By-product water is collected by a by-product collecting section 109 described later.

Here, a required heating temperature in the reaction furnace of the reforming reaction section 8 constituted by the reforming flow path 42 is about 250 to 320° C., and a required heating temperature in the reaction furnace of the carbon monoxide elimination section 9 constituted by the carbon monoxide elimination flow path 43 is lower than the above and is about 160 to 220° C., and a required heating temperature in the reaction furnace of the generation fuel vaporization section 7 constituted by the vaporization flow path 41 is still lower than the above and is about 100 to 150° C. The vaporization flow path 41 may be provided with a metal film therein whose thermal conductivity is higher than those of the first substrate 12 and the second substrate 13 to effectively absorb the heat from the heat source and emit it into the flow path.

As described above, the combustion flow path 76 of the combustion section 10 and the thin film heater 11, which are the heat sources, are disposed in the central part of the first to third substrates 12 to 14, and the reforming flow path 42 of the reforming reaction section 8 whose required heating temperature (about 250 to 320° C.) is the highest is disposed in the central part, and outside this, the carbon monoxide elimination flow path 43 of the carbon monoxide elimination section 9 whose required heating temperature (about 160 to 220° C.) is lower than the above is disposed, and further outside this, the vaporization flow path 41 of the generation fuel vaporization section 7 whose required heating temperature (about 100 to 150° C.) is still lower is disposed. In this way, the distance from the combustion section 10 is shorter in the order of the reforming flow path 42, the carbon monoxide elimination flow path 43 and the vaporization flow path 41, and the distance from the thin film heater 11 is shorter in the order of the reforming flow path 42, the carbon monoxide elimination flow path 43 and the vaporization flow path 41. Thus, the heat energy generated in the combustion section 10 and the thin film heater 11 first heats the reforming reaction section 8 at its required heating temperature. The temperature decreases as the heat energy is transmitted through the first to third substrates 12 to 14. When it reaches the carbon monoxide elimination section 9 positioned on a periphery of the reforming reaction section 8, the temperature lowers to the required heating temperature of the carbon monoxide elimination section 9. Finally, when it reaches the generation fuel vaporization section 7 positioned outside the carbon monoxide elimination section 9 via the first to third substrates 12 to 14, the temperature lowers to the required heating temperature of the generation fuel vaporization section 7. Thus, the generation fuel vaporization section 7, the reforming reaction section 8 and the carbon monoxide elimination section 9 are respectively heated to their suitable temperatures.

While the heating temperature is easily controlled in the thin film heater 11, it is difficult to accurately control the heating temperature in the reforming flow path 42 by control of the combustion reaction in the combustion flow path 76 of the combustion section 10. Therefore, the heat energy generated by the combustion reaction in the combustion flow path 76 is brought to, for example, about 190 to 300° C., which is slightly lower than the required heating temperature (about 250 to 320° C.) in the reforming flow path 42 of the reforming reaction section 8. Then, the control circuit section 20 receives information on the temperature in the reforming flow path 42 from the electrodes 33 and feeds back electric power to be supplied to the thin film heater 11, so that the required heating temperature can be rapidly reached, and fine temperature control that continuously maintains the required temperature can be achieved, whereby the generation fuel vaporization section 7. Accordingly, the reforming reaction section 8 and the carbon monoxide elimination section 9 can be kept within the required heating temperatures.

If materials for the first to third substrates 12 to 14 are glass, silicon, ceramic, metals and the like, their thermal conductivities are significantly higher than that of the air, so that without any measures to be taken, the temperature becomes about the same throughout the first to third substrates 12 to 14. Therefore, as described above, the four slits 56 are provided in the parts of the first to third substrates 12 to 14 at the periphery of the area where the combustion flow path 76 of the combustion section 10, the thin film heater 11, and the reforming flow path 42 of the reforming reaction section 8 are disposed, and a vacuum is formed in the atmosphere inside these slits 56 or a gas with low thermal conductivity (such as atmospheric air, carbon dioxide gas or chlorofluorocarbon) fills the atmosphere inside these slits 56, whereby it is possible to inhibit the heat energy generated in the combustion section 10 and the thin film heater 11 from being excessively transmitted into the carbon monoxide elimination flow path 43 and the vaporization flow path 41 via the first to third substrates 12 to 14. Porous structures with heat transmission properties made of ceramic or the like may be contained in the slits 56.

In the case of only the first to third substrates 12 to 14, because their sizes are small and a ratio of a surface area to a volume is large, the heat energy released into the atmosphere becomes large, and utilization efficiency of heat energy becomes lower. Therefore, as described above, the first to third substrates 12 to 14 are covered with the first and second outer panels 15 and 16, and the space 37 is provided therebetween, and then a vacuum is formed in or a gas with low thermal conductivity (such as atmospheric air, carbon dioxide gas, chlorofluorocarbon or inactive gas) fills the atmosphere of the space 37, and then the outer surfaces of the first to third substrates 12 to 14 are covered with the heat generation prevention film 36 and the inner surfaces of the first outer panel 15 and the second outer panel 16 are covered with the heat generation prevention film 35, whereby it becomes possible to inhibit the heat energy generated by the combustion section 10 and the thin film heater 11 from being released into the atmosphere, and to improve efficiency in utilization of heat energy.

In the case where the first to third substrates 12 to 14 are covered with the first and second outer panels 15 and 16 to reduce the heat released into the atmosphere, if the temperature in the first and second outer panels 15 and 16 increases too high and it is difficult to maintain temperature distribution in the first to third substrates 12 to 14 at an initial value even after transmitted heat is adjusted by the slits 56, all or part of the plurality of pressure resistant spacers 38 is formed of a material with high thermal conductivity such as a metal or glass, and the heat is moderately released outside the micro chemical reactor 4 via the pressure resistant spacers 38. Thus, the temperature distribution in the first to third substrates 12 to 14 can be brought to the initial value. Furthermore, when the heat generation of the thin film heater 11 and the combustion section 10 is stopped, such heat release by use of the pressure resistant spacers 38 can serve to rapidly lower the temperature in the first and second outer panels 15 and 16.

In this way, the fuel cell system 1 adjusts the heat released to the outside thereof via the pressure resistant spacers 38, so that the temperature distribution in the first to third substrates 12 to 14 can be maintained at the initial value.

Figure 7:
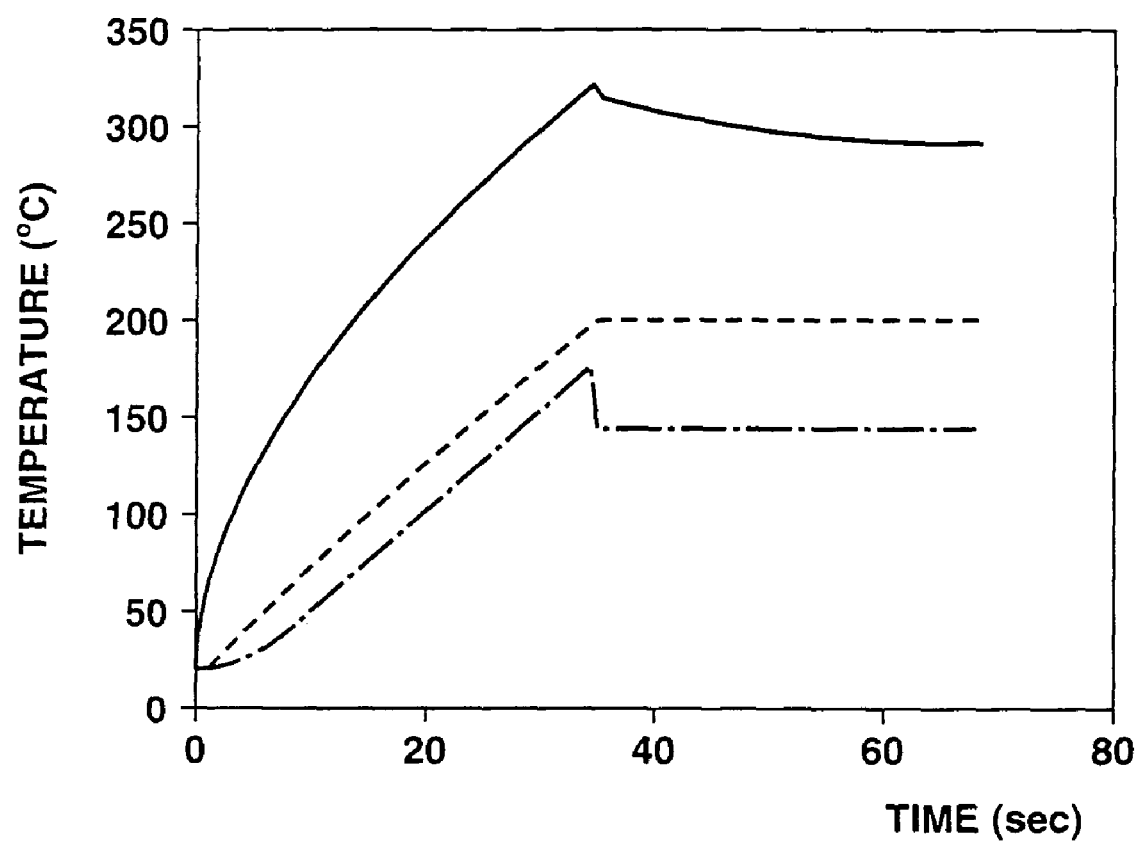
FIG. 7 is a graph showing changes with time of heating temperatures in a vaporization flow path, a reforming flow path and a carbon monoxide elimination flow path.

Here, after heated with the heat energy generated in the combustion section 10 and the heat energy generated in the thin film heater 11, changes with time of the respective heating temperatures in the vaporization flow path 41, the reforming flow path 42 and the carbon monoxide elimination flow path are checked, thereby obtaining results shown in FIG. 7. In FIG. 7, a solid line indicates the heating temperature in the reforming flow path 42 of the reforming reaction section 8, a broken line indicates the heating temperature in the carbon monoxide elimination flow path 43 of the carbon monoxide elimination section 9, and a dashed line indicates the heating temperature in the vaporization flow path 41 of the generation fuel vaporization section 7.

As apparent from FIG. 7, after about 40 seconds from the start of heat generation, each heating temperature is almost stabilized, and the heating temperature in the reforming flow path 42 indicated by the solid line can be about 300° C., and the heating temperature in the carbon monoxide elimination flow path 43 indicated by the broken line can be about 200° C., and further the heating temperature in the vaporization flow path 41 indicated by the dashed line can be about 150° C.

In this way, by heating with the heat energy generated in the combustion flow path 76 of the combustion section 10 and the heat energy generated by the thin film heater 11, the heating temperature in the reaction furnace of the reforming reaction section 8 constituted by the reforming flow path 42 is brought to the required heating temperature of about 250 to 320° C., the heating temperature in the reaction furnace of the carbon monoxide elimination section 9 constituted by the carbon monoxide elimination flow path 43 is brought to the required heating temperature of about 160 to 220° C., and the heating temperature in the reaction furnace of the generation fuel vaporization section 7 constituted by the vaporization flow path 41 is brought to the required heating temperature of about 100 to 150° C.

When the generation fuel 68 in liquid form (e.g., a methanol solution) is supplied to the starting end of the vaporization flow path 41 from the first micro pump 46, the generation fuel 68 is vaporized in the vaporization flow path 41 which is heated to the required heating temperature of about 100 to 150° C. inside, and the generation fuel gas (e.g., $CH_3OH(g)$+ $H_2O(g)$ when the generation fuel 68 is a methanol solution) is generated. In other words, the generation fuel gas ($CH_3OH+H_2O$) is generated in the generation fuel vaporization section 7.

This generated generation fuel gas ($CH_3OH+H_2O$) is supplied into the reforming flow path 42. In other words, the generation fuel gas ($CH_3OH+H_2O$) generated in the generation fuel vaporization section 7 is supplied to the reforming reaction section 8. Then, when the generation fuel gas ($CH_3OH+H_2O$) is supplied into the reforming flow path 42 having the reforming catalyst layer 44, an endothermal reaction as indicated by the following equation (2) is caused in the reforming flow path 42 because the inside of the reforming flow path 42 is heated to the required heating temperature of about 250 to 320° C., thereby producing hydrogen and by-product carbon dioxide.

$$CH_3OH+H_2O \rightarrow 3H_2+CO_2 \qquad (2)$$

At this time, a slight amount of carbon monoxide might be produced in the reforming flow path 42. These products (hydrogen, carbon dioxide and the slight amount of carbon monoxide) are supplied into the carbon monoxide elimination flow path 43. In other words, hydrogen, carbon dioxide and the slight amount of carbon monoxide produced in the reforming reaction section 8 are supplied to the carbon monoxide elimination section 9. These products (hydrogen, carbon dioxide and the slight amount of carbon monoxide) are mixed with oxygen (air) supplied via the oxygen supply tubule 23 from the atmosphere outside the fuel cell system 1 at the predetermined portion 43a in the vicinity of the starting end of the carbon monoxide elimination flow path 43. In this case, a check valve is provided in the oxygen supply tubule 23, so that the products do not leak outside the fuel cell system 1.

When a mixture (hydrogen, carbon dioxide, the slight amount of carbon monoxide and oxygen) is supplied into the carbon monoxide elimination flow path 43 having the selective oxidative catalyst layer 45, carbon monoxide and oxygen are reacted in carbon monoxide elimination flow path 43 whose inside is heated to the required heating temperature of about 160 to 220° C., thereby producing carbon dioxide as indicated by the following equation (3).

$$CO+(\tfrac{1}{2})O_2 \rightarrow O_2+CO_2 \qquad (3)$$

Finally, most of fluids reaching the terminal end of the carbon monoxide elimination flow path 43 that constitutes the reaction furnace of the carbon monoxide elimination section 9 are hydrogen and carbon dioxide. These products are discharged outside via the generation product discharge tubule 22, but, out of these products, carbon dioxide is separated from hydrogen by a separation section 66 (see FIG. 1) to be released outside the fuel cell system 1. Therefore, hydrogen and water vapor are supplied from the carbon monoxide elimination section 9 to the fuel cell section 5.

As described above, in the micro chemical reactor 4 having the above configuration, in the inner surface of the first substrate 12, the vaporization flow path 41 which constitutes the reaction furnace of the generation fuel vaporization section 7, the reforming flow path 42 which constitutes the reaction furnace of the reforming reaction section 8 and the carbon monoxide elimination flow path 43 which constitutes the reaction furnace of the carbon monoxide elimination section 9 are continuously provided within the same substrate, so that three chemical reactions can be successively caused in three kinds of flow paths, i.e., the vaporization flow path 41, the reforming flow path 42 and the carbon monoxide elimination flow path 43, thereby enabling the whole reactor to be simple and compact.

Furthermore, the combustion flow path 76 of the combustion section 10 and the thin film heater 11, which are the heat sources, are disposed in the central part of the first to third substrates 12 to 14, and the reforming flow path 42 of the reforming reaction section 8 whose required heating temperature (about 250 to 320° C.) is the highest is disposed in the central part, and outside this, the carbon monoxide elimination flow path 43 of the carbon monoxide elimination section 9 whose required heating temperature (about 160 to 220° C.) is lower than the above is disposed, and further outside this, the vaporization flow path 42 of the generation fuel vaporization section 7 whose required heating temperature (about 100 to 150° C.) is still lower is disposed, and the slits 56 adjust the transmitted heat, whereby efficient heating can be achieved in the vaporization flow path 41, the reforming flow path 42 and the carbon monoxide elimination flow path 43 so as to reform the generation fuel 68.

Figure 8:
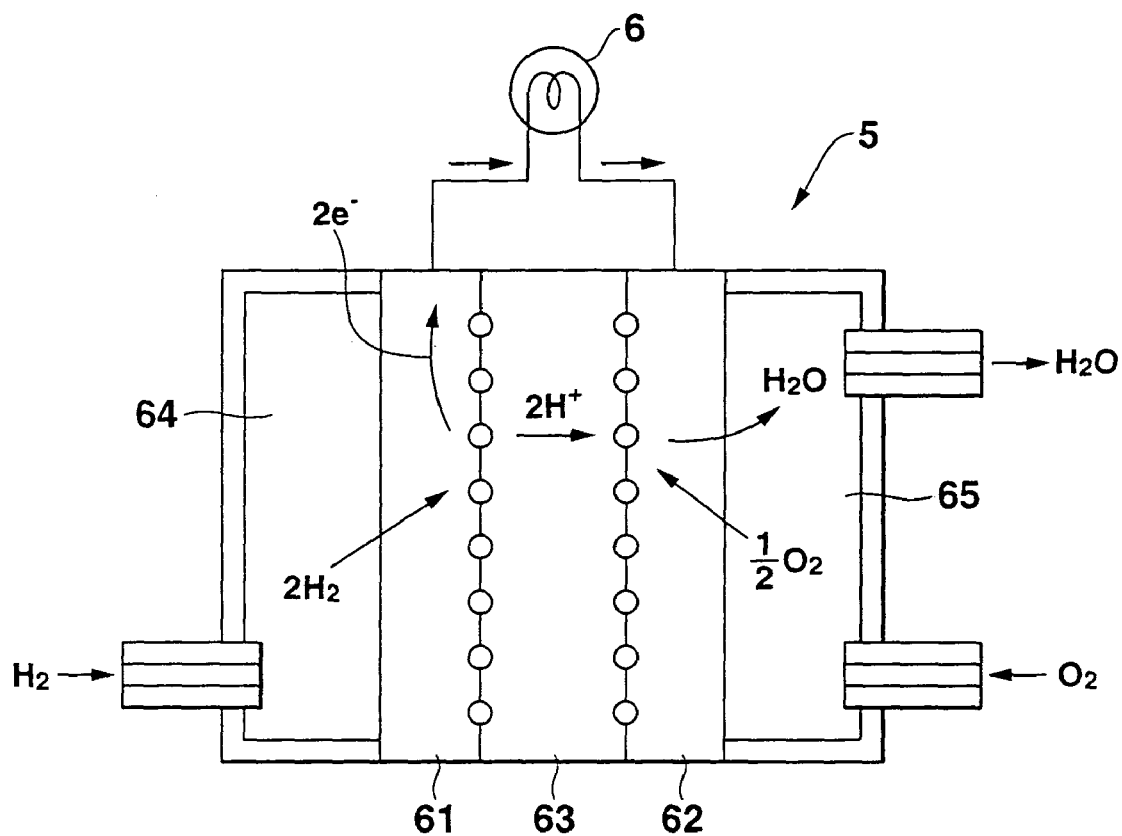
FIG. 8 is a schematic configuration diagram of a fuel cell section and a charging section shown in FIG. 1.

Next, the fuel cell section 5 and the charging section 6 will be described. The fuel cell section 5 is constituted by a solid macromolecule type fuel cell as shown in FIG. 8. More specifically, the fuel cell section 5 has a cathode 61 is formed of a carbon electrode to which catalysts such as Pt and C are stuck, an anode 62 formed of a carbon electrode to which catalysts such as Pt, Ru and C are stuck. A film-like ion conductive film 63 is placed between the cathode 61 and the anode 62, thereby supplying electric power to the charging section 6 constituted of a secondary cell or a capacitor provided between the cathode 61 and the anode 62.

In this case, a space section 64 is provided is outside the cathode 61. Hydrogen and water are supplied into the space section 64 via the separation section 66, and thus hydrogen and water reach the cathode 61. Another space section 65 is provided outside the anode 62. Oxygen taken in from the atmosphere via the micro pump is supplied into the space section 65, and thus oxygen is supplied to the anode 62.

Hydrogen ions (proton; $H^+$) in which electrons ($e^-$) are separated from hydrogen are produced on a side of the cathode 61 as shown in the following equation (4), and pass to a side of the anode 62 via the ion conductive film 63, and then the cathode 61 takes out electrons ($e^-$) therefrom to allow a current to flow.

$$H_2 \rightarrow 2H^+ + 2e^- \qquad (4)$$

On the other hand, electrons ($e^-$) supplied by way of the charging section 6, hydrogen ions ($H^+$) which have passed through the ion conductive film 63, and oxygen cause a reaction on the side of the anode 62, thereby producing by-product water, as shown in the following equation (5).

$$2H^+ + (\tfrac{1}{2})O_2 + 2e^- \rightarrow H_2O \qquad (5)$$

The series of electrochemical reactions described above (equation (4) and equation (5)) proceed under an environment at a relatively low temperature of about room temperature to 80° C., and water is basically the only by-product except for electric power. The electric power generated by the fuel cell section 5 is supplied to the charging section 6, whereby the charging section 6 is charged. Water as the by-product produced by the fuel cell section 5 is once taken in by a by-product take-in section 107, and is subsequently collected by a by-product collecting section 109 in a fuel storage module 102 described later. The by-product take-in section 107 may supply a proper amount of taken-in water to the reforming reaction section 8 and the carbon monoxide elimination section 9 as necessary.

Here, in the micro chemical reactor 4 having the above configuration, the first to third substrates 12 to 14 that are laminated on each other are accommodated in the first and second outer panels 15 and 16 that are joined to each other, which makes it possible to save space and design the size and shape of the fuel cell system 1 itself to correspond to the size and shape of multipurpose chemical cells such as dry cells.

Figure 9:
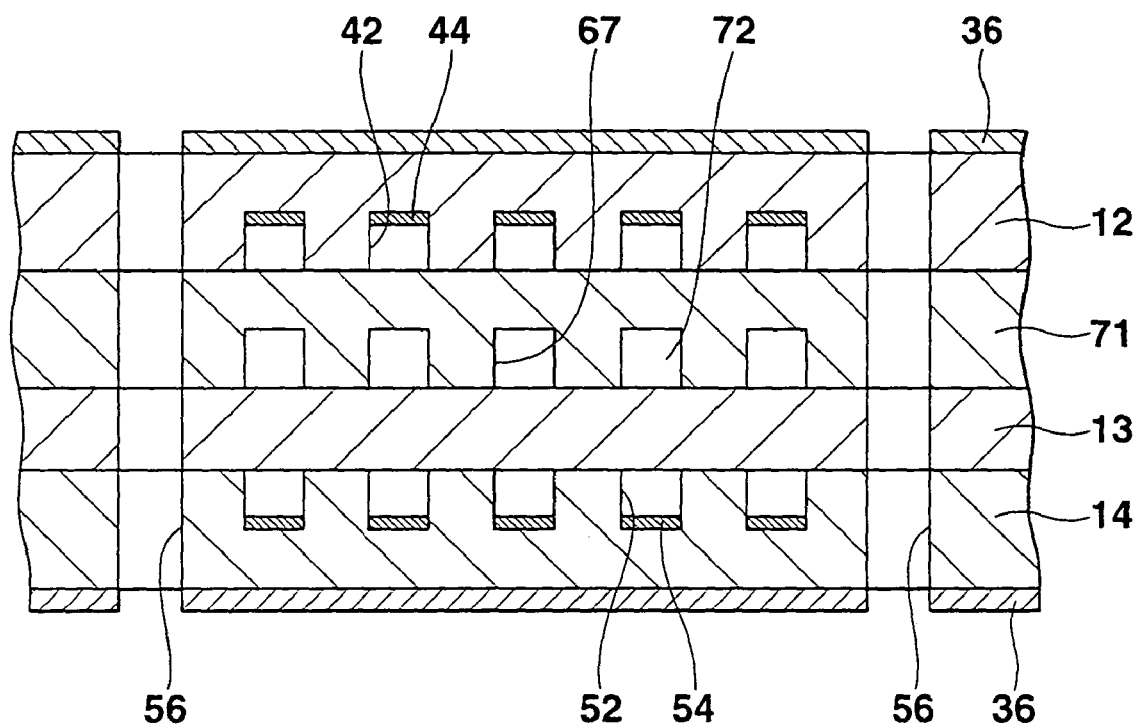
FIG. 9 is a cross sectional view similar to FIG. 3 showing the essential parts of the chemical reactor as another embodiment of this invention.
Figure 10:
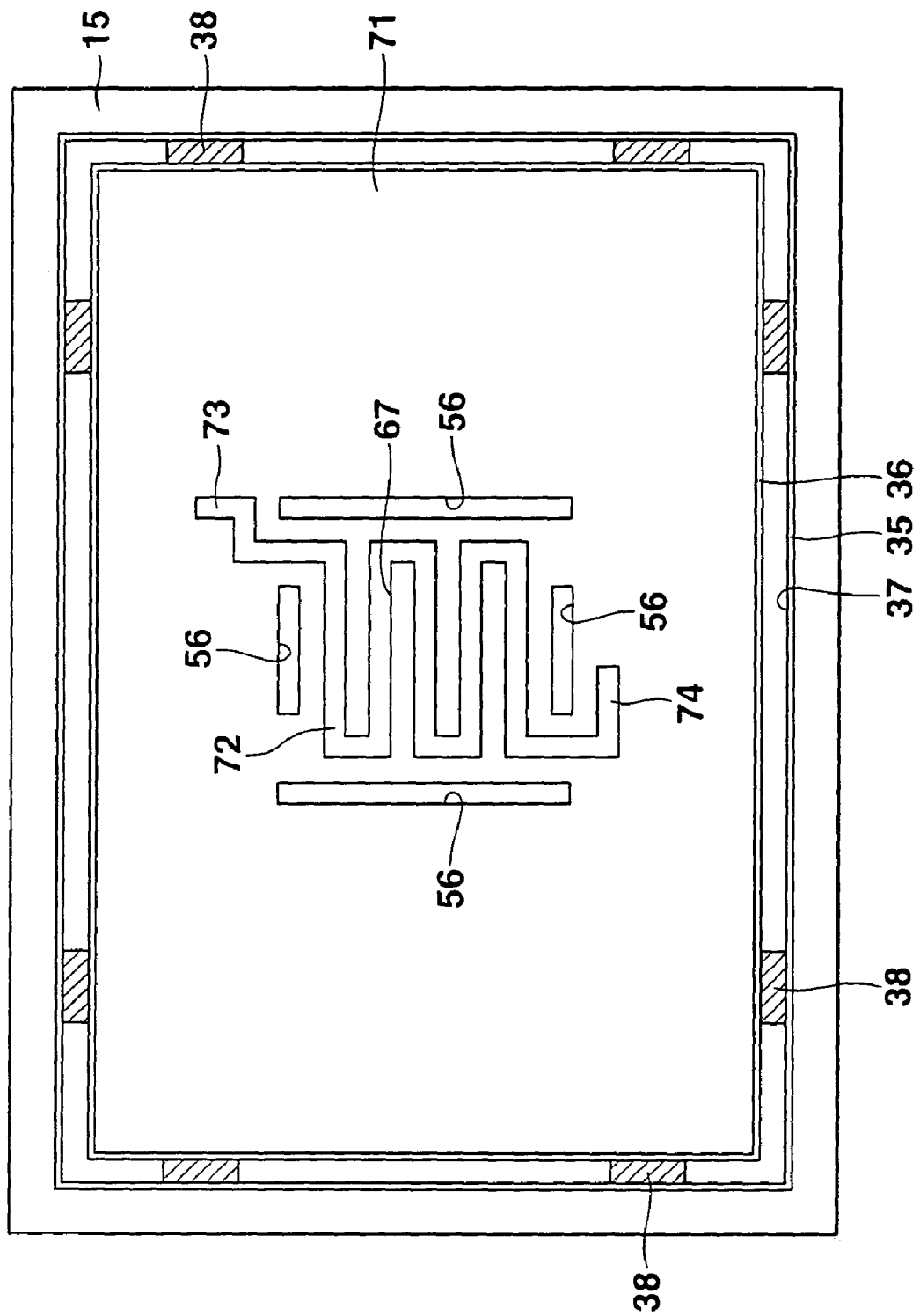
FIG. 10 is a transmitted plan view of a part corresponding to a fourth substrate shown in FIG. 9.

In the embodiment described above, the case where the thin film heater 11 is used as part of the heat source has been described, which is not limited. For example, another embodiment of this invention shown in FIG. 9 and FIG. 10 may be applied. FIG. 9 is a cross sectional view similar to FIG. 3 showing the essential parts of the micro chemical reactor as another embodiment of this invention, and FIG. 10 is a transmitted plan view of a part corresponding to a fourth substrate 71.

In this case, the fourth substrate 71 is provided between the first substrate 12 and the second substrate 13. The thin film heater is not provided in the central part of the surface of the second substrate 13 opposite to the fourth substrate 71. Instead, a thermal fluid flow path groove 67 is cut in the central part of the surface of the fourth substrate 71 opposite to the second substrate 13. The thermal fluid flow path groove 67 and the second substrate 13 are combined with each other to form a thermal fluid flow path 72. The thermal fluid flow path 72 is provided meanderingly, similarly to the reforming flow path 42 and the combustion flow path 76. An inflow side flow path 73 is provided in the thermal fluid flow path groove 67 on an inflow side of the thermal fluid flow path 72, and an outflow side flow path 74 is provided in the thermal fluid flow path groove 67 on an outflow side.

An inflow side end of the inflow side flow path 73 is disposed at such a position that it does not overlap the terminal end of the vaporization flow path 41 shown in FIG. 4, and is connected to one end of a thermal fluid supply tubule that is inserted into the round transmitting hole provided at predetermined portions of the first outer panel 15 and the first substrate 12, which is not shown in the drawing. An outflow side end of the outflow side flow path 74 is disposed at such a position that it does not overlap the starting end of the carbon monoxide elimination flow path 43 shown in FIG. 4, and is connected to one end of a thermal fluid discharge tubule that is inserted into the round transmitting hole provided at other predetermined portions of the first outer panel 15 and the first substrate 12, which is not shown in the drawing.

The other end of the thermal fluid supply tubule and the other end of the thermal fluid discharge tubule are connected to both ends of a thermal fluid circuit having a micro pump and a heater provided outside the micro chemical reactor 4, which is not shown in the drawing. Then, liquid such as silicon oil or gases such as water vapor, air and nitrogen are supplied as the thermal fluid into the thermal fluid flow path 72, and the vaporization flow path 41. The reforming flow path 42 and the carbon monoxide elimination flow path 43 are heated with heat energy obtained from the supplied thermal fluid. However, also in this case, heating is carried out mainly with the heat energy generated by the combustion through a catalyst combustion reaction in the combustion flow path 76 of the combustion section 10. The heat energy from the thermal fluid is used for secondary heating. The thermal fluid stores the heat energy of the combustion section 10 and circulates in the thermal fluid flow path 72 as necessary.

Figure 11:
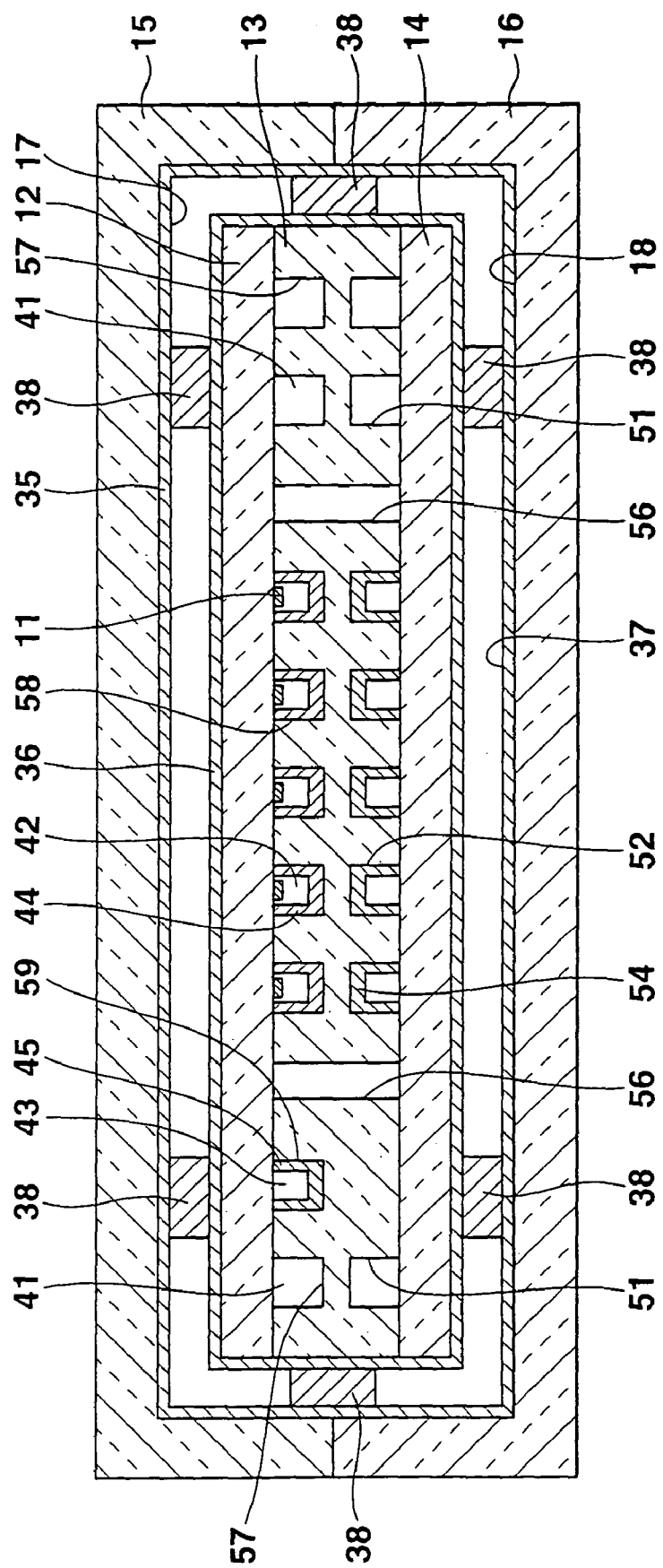
FIG. 11 is a cross sectional view similar to FIG. 3 showing the essential parts of the chemical reactor as still another embodiment of this invention.

In the embodiment described above, the grooves are respectively provided in the first substrate 12 and the third substrate 14 to form the flow paths, but as shown in FIG. 11, the vaporization flow path groove 57, the reforming flow path groove 58 and the carbon monoxide elimination flow path groove 59 that are continuously formed in one surface of the second substrate 13, and the first substrate 12 which covers those grooves, may constitute the vaporization flow path 41 of the generation fuel vaporization section 7, the reforming flow path 42 of the reforming reaction section 8 and the carbon monoxide elimination flow path 43 of the carbon monoxide elimination section 9, respectively. Further, the combustion fuel vaporization flow path groove 51, the combustion flow path groove 52 and the discharge flow path groove 53 that are continuously formed in the other surface of the second substrate 13, and the third substrate 14 which covers those grooves, may constitute the combustion fuel vaporization flow path 75, the combustion flow path 76, and the discharge flow path 77 respectively.

FIG. 11 is a cross sectional view along a line similar to the line III-III of FIG. 2, in which the generation fuel supply tubule 21, the oxygen supply tubule 23, the combustion fuel supply tubule 27, the electrodes 33 and the discharge flow path 77 are not illustrated. The second substrate 13 is a silicon substrate with excellent workability and relatively high thermal conductivity, and the first substrate 12 and the third substrate 14 which are on and under the second substrate 13 are made of glass whose thermal conductivity is lower than that of the silicon substrate, and thus the vaporization flow path 41, the reforming flow path 42 and the carbon monoxide elimination flow path 43 can have a configuration that is easy to heat and capable of storing heat so that the heat is not extremely generated outside. The reforming catalyst layer 44 and the selective oxidative catalyst layer 45 have been formed on three surfaces of the groove, but may be formed on at least one surface or more.

In the embodiments described above, the carbon monoxide elimination section 9 oxidizes carbon monoxide in accordance with the above equation (3), but may oxidize it by an aqueous shift reaction represented by the following equation (6), and the carbon monoxide elimination flow path 43 may be provided with both parts where the chemical reactions of equation (6) and the equation (3) are caused.

$$CO+H_2O \rightarrow CO_2+H_2 \tag{6}$$

Water, which causes the aqueous shift of carbon monoxide, on a left side of the equation (6) is contained in the generation fuel section 2, and water which has not reacted in the above equation (2) may be used, and water taken in by the by-product take-in section 107 from the fuel cell section 5 may also be used. Since the reaction of the equation (6) produces hydrogen, an amount of hydrogen supplied to the fuel cell section 5 can be increased, so that the part which causes the reaction of the equation (6) should preferably be provided closer to a side of the reforming flow path 42 than the part which causes the reaction of the equation (3).

In the embodiments described above, the slits 56 are continuously provided in the first substrate 12, the second substrate 13 and the third substrate 14, but in order to improve strength, the slits provided side by side with each other in the first substrate 12, the second substrate 13 and the third substrate 14 may be displaced to be arranged in such a manner that they do not overlap each other.

Figure 12:
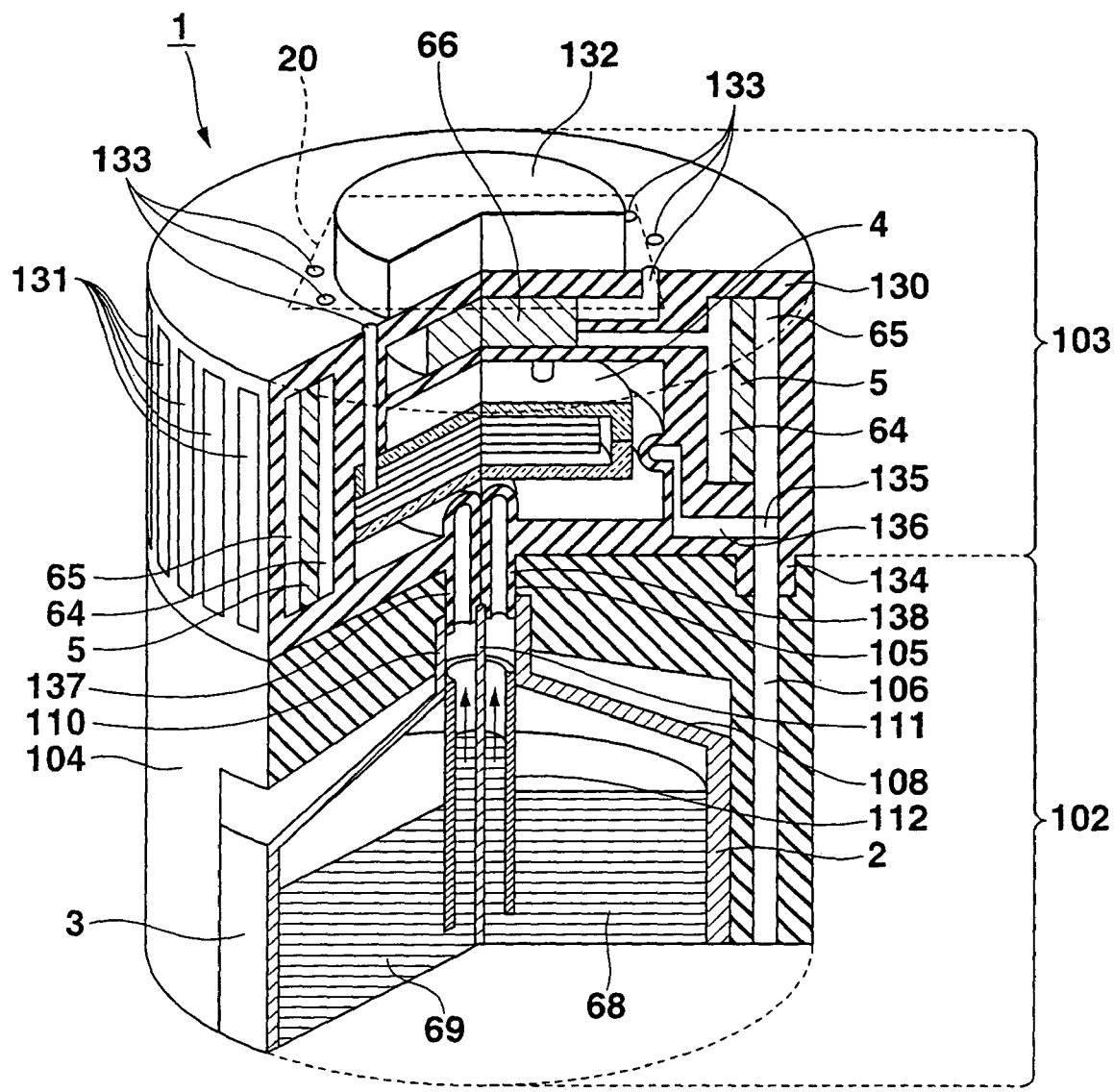
FIG. 12 is a perspective view showing the partially broken fuel cell system comprising the chemical reactor of the present invention.

FIG. 12 is a perspective view of the partially broken fuel cell system 1 comprising the compact chemical reactor and fuel cell of the present invention.

As shown in FIG. 12, the fuel cell system 1 comprises a fuel storage module 102 which stores the generation fuel 68 to be reformed and the combustion fuel 69 to be combusted, and a power generation module 103 which has the built-in micro chemical reactor 4 to generate electricity using the generation fuel 68 stored in the fuel storage module 102. The micro chemical reactor 4 has the generation fuel vaporization section 7, the reforming reaction section 8, the carbon monoxide elimination section 9, the combustion section 10, the thin film heater section 11, the first micro pump 46 and the second micro pump 47.

The fuel storage module 102 has a substantially cylindrical case 104. The case 104 can be detachably attached to the power generation module 103. A round through-hole 105 is formed at a head top portion of the case 104, and a first drain pipe 106 which allows by-product water produced by the power generation module 103 to flow is formed in an inner part of an outer periphery of the case 104. The by-product collecting section 109 which stores water to be drained is disposed at a bottom of the fuel storage module 102. The by-product collecting section 109 is connected to a first drain pipe 106.

A fuel package 108 is detachably housed inside the case 104, and part of an outer peripheral surface of the fuel package 108 is exposed from the outside of the case 104. The fuel package 108 further has the generation fuel section 2 in which the generation fuel 68 is sealed and the combustion fuel section 3 in which the combustion fuel 69 is sealed. The fuel package 108 is a transparent or semitransparent columnar member having an internal space, and is made of a biodegradable material degraded by bacteria or the like. As part of the fuel package 108 is exposed and the fuel package 108 is transparent or semitransparent, it is possible to easily check the presence and remaining amount of the generation fuel 68 and the combustion fuel 69 inside through the fuel package 108.

The generation fuel 68 is a mixture of a liquid chemical fuel and water, and alcohols such as methanol and ethanol or carbon compounds containing a hydrogen element, for example, ethers such as diethyl ether and gasoline are applicable as the chemical fuel. In the present embodiment, a mixture in which methanol and water are mixed is used as the generation fuel 68.

The combustion fuel 69 is a liquid chemical fuel, and alcohols such as methanol and ethanol or carbon compounds containing a hydrogen element, for example, ethers such as diethyl ether and gasoline are applicable as the chemical fuel. In the present embodiment, a high concentration of methanol is used as the combustion fuel 69.

A partition plate 111 which separates the generation fuel 68 from the combustion fuel 69 is formed inside the fuel package 108. A supply port 110 for supplying the generation fuel 68 and the combustion fuel 69 to the power generation module 103 is provided at the head top portion of the fuel package 108 in a manner to protrude to be inserted into the through-hole 105 of the case 104.

A supply pipe 112 extending in upward and downward directions of FIG. 12 to be inserted in the supply port 110 is provided inside the fuel package 108. The supply pipe 112 extends from the bottom of the fuel package 108 to an edge of the supply port 110. Since the supply pipe 112 is divided into small parts by the partition plate 111, the generation fuel 68 between the supply pipe 112 and the partition plate 111 moves upward by a capillary phenomenon to reach the first micro pump 46. The combustion fuel 69 between the supply pipe 112 and the partition plate 111 moves upward by the capillary phenomenon to reach the second micro pump 47.

A sealing film is provided inside the supply port 110, which closes the entire supply port 110 so that the generation fuel 68 and the combustion fuel 69 do not leak in a state where intake nipple portions 137, 138 of the power generation module 103 are not inserted, but the intake nipple portions 137, 138 of the power generation module 103 are inserted into the supply port 110 in order to break the sealing film, and the intake nipple portions 137, 138 communicate with the fuel package 108 so that they can take in the generation fuel 68 and the combustion fuel 69, respectively.

The power generation module 103 includes an almost cylindrical case 130. The micro chemical reactor 4 is disposed inside the case 130. The fuel cell section 5 is disposed on a periphery of the micro chemical reactor 4 and on an outer peripheral side of the case 130. A by-product take-in section 135 takes in part of the by-product produced by the fuel cell section 5 and supplies this to the micro chemical reactor 4 as necessary. The control circuit section 20 electrically controls those above.

A plurality of slits 131 for supplying oxygen in the air outside the power generation module 103 that is needed for power generation by the fuel cell section 5 to the fuel cell section 5 is formed in a state arranged in parallel with each other outside the fuel cell section 5 and in an outer peripheral surface of the case 130.

A terminal 132 for supplying electric energy generated by the fuel cell section 5 to an external device is provided at the head top portion of the case 130. A plurality of air holes 133 for taking in oxygen necessary for the combustion section 10 of the micro chemical reactor 4 to combust the combustion fuel 69 as well as oxygen necessary for the carbon monoxide elimination section 9 to oxidize carbon monoxide and for discharging carbon dioxide produced by the micro chemical reactor 4 are formed on a periphery of the terminal 132 and at the head top portion of the case 130.

A second drain pipe 134 is provided on the outer peripheral side of the case 130. The second drain pipe 134 has a convex shape whose edge protrudes downward from the bottom of the case 130, and the convex portion can be received in a corresponding concave part in the first drain pipe 106 of the fuel storage module 102. The second drain pipe 134 is a pipe for allowing by-product water produced by the fuel cell section 5 to be distributed. The by-product water is discharged to the by-product take-in section 135 through the second drain pipe 134 and the first drain pipe 106.

The second drain pipe 134 is coupled to the by-product take-in section 135. A water introduction pipe 136 provided in the case 130 leads to the second drain pipe 134 via the by-product take-in section 135. The by-product take-in section 135 functions as a pump which introduces the by-product water produced by the fuel cell section 5 to the micro chemical reactor 4 as necessary, and supplies a proper amount of water intended for the micro chemical reactor 4 to the water introduction pipe 136, and then discharges extra water to the second drain pipe 134. The sections requiring water in the micro chemical reactor 4 include the reforming reaction section 8 which causes the reforming reaction of the above equation (2) and the carbon monoxide elimination section 9 which causes the aqueous shift reaction of the above equation (6). The micro chemical reactor 4 reuses water thus produced in the fuel cell system 1, thereby making it possible to heighten the concentration of chemical fuel except for water contained in the generation fuel 68 in the generation fuel section 2 of the fuel package 108, and increase an amount of produced hydrogen per unit volume of the fuel, and also increase output of the fuel cell section 5 per unit volume of the fuel.

In the fuel storage module 102 and the power generation module 103 as described above, when the fuel storage module 102 storing the fuel package 108 is attached to the power generation module 103, the second drain pipe 134 of the power generation module 103 is connected to the first drain pipe 106 of the fuel storage module 102 on an outer peripheral side of an area where the modules 102, 103 are connected. In this way, the second drain pipe 134 communicates with the first drain pipe 106, thereby making it possible to let the by-product water produced by the power generation module 103 flow from the second drain pipe 134 to the first drain pipe 106 to be discharged to the by-product take-in section 135.

The fuel applied to the fuel-reforming type fuel cell presently under research and development may be a fuel which is at least a liquid fuel or liquefied fuel or gas fuel containing hydrogen elements and from which electric energy can be generated by the fuel cell section 5 at a relatively high energy conversion efficiency, and fluid fuels that can be satisfactorily applied include alcoholic liquid fuels such as ethanol and butanol in addition to methanol mentioned above, liquid fuels made of hydrocarbons which are vaporized at ordinary temperature and at atmospheric pressure, for example, liquefied gases such as dimethyl ether, isobutane and natural gas (CNG), or a gas fuel such as a hydrogen gas.

As described above, according to this invention, the flow paths are provided inside the flow path structure and the flow paths are constituted of a plurality of continued parts where different chemical reactions take place, so that a plurality of chemical reactions can be efficiently caused continuously in plural kinds of flow paths, and the whole reactor can be made simple and compact.

The invention claimed is:

1. A chemical reactor comprising:
   a first reaction section which has a first flow path, which is provided in a surface of a substrate, and in which a first reaction is caused;
   a heating section which heats the first reaction section;
   a second reaction section which has a second flow path, which is provided in said surface of said substrate, and in which a second reaction is caused using heat from the heating section transmitted via the first reaction section; and
   at least one partition provided between the first reaction section and the second reaction section,
   wherein the first and second flow paths are continuous with each other in said surface of said substrate.

2. The chemical reactor according to claim 1, wherein the at least one partition comprises at least one part of the substrate.

3. The chemical reactor according to claim 1, wherein at least a part of a region between the first reaction section and the second reaction section has a thermal conductivity that is lower than a thermal conductivity of the substrate.

4. The chemical reactor according to claim 3, wherein said part of the region between the first reaction section and the second reaction section has provided therein a gas having a thermal conductivity that is lower than the thermal conductivity of the substrate.

5. The chemical reactor according to claim 3, wherein said part of the region between the first reaction section and the second reaction section comprises a space that is depressurized to 1 Pa or less.

6. The chemical reactor according to claim 1, further comprising a control circuit section which controls the first reaction caused in the first reaction section and the second reaction caused in the second reaction section to be different reactions.

7. The chemical reactor according to claim 6, wherein the control circuit section controls the second reaction caused in the second reaction section to be caused at a temperature that is lower than a temperature at which the first reaction is caused in the first reaction section.

8. The chemical reactor according to claim 1, wherein the first flow path and the second flow path are coupled.

9. The chemical reactor according to claim 1, wherein the second reaction section comprises a vaporization reaction section which vaporizes a generation fuel, and the first reaction section comprises a reforming reaction section which reforms the vaporized generation fuel.

10. The chemical reactor according to claim 1, wherein the first reaction section comprises a reforming reaction section which reforms a generation fuel, and the second reaction section comprises a carbon monoxide elimination section which eliminates carbon monoxide produced in the first reaction section.

11. The chemical reactor according to claim 1, wherein the substrate is made of a material which transmits the heat of the heating section from the first reaction section to the second reaction section.

12. The chemical reactor according to claim 1, wherein a distance between the first flow path and the heating section is shorter than a distance between the second flow path and the heating section.

13. The chemical reactor according to claim 1, wherein the second flow path is disposed on a periphery of the first flow path.

14. The chemical reactor according to claim 1, wherein the substrate has grooves formed therein which form the first flow path and the second flow path.

15. The chemical reactor according to claim 1, wherein the first reaction section and the second reaction section are micro reactors.

16. The chemical reactor according to claim 1, further comprising:
   a thermometer section which measures a temperature of the heating section.

17. The chemical reactor according to claim 16, further comprising:
   a control circuit section which causes the heating section to generate heat based on temperature information obtained by the thermometer section.

18. The chemical reactor according to claim 16, wherein the thermometer section is provided in the first flow path.

19. The chemical reactor according to claim 1, wherein the heating section comprises a combustion section which performs heating by a combustion reaction.

20. The chemical reactor according to claim 19, wherein the substrate is made of a material which transmits heat from the combustion reaction to the first reaction section.

21. The chemical reactor according to claim 1, wherein the heating section comprises a resistive element.

22. The chemical reactor according to claim 1, further comprising:
   a third reaction section which has a third flow path in which a third reaction is caused using the heat from the heating section that is transmitted via the second reaction section; and
   at least one other partition which is provided between the second reaction section and the third reaction section.

23. The chemical reactor according to claim 22, further comprising a control circuit section which controls the third reaction in the third reaction section to be caused at a temperature that is lower than a temperature at which the first reaction is caused in the first reaction section.

24. The chemical reactor according to claim 22, wherein the control circuit section controls the third reaction to be caused at a temperature that is lower than a temperature at which the second reaction is caused in the second reaction section.

25. The chemical reactor according to claim 22, wherein the third flow path and the first flow path are coupled.

26. The chemical reactor according to claim 22, wherein the third reaction section comprises a vaporization reaction section which vaporizes a generation fuel, the first reaction section comprises a reforming reaction section which reforms the vaporized generation fuel, and the second reaction section comprises a carbon monoxide elimination section which eliminates carbon monoxide produced in the first reaction section.

27. The chemical reactor according to claim 22, wherein the first flow path, the second flow path, and the third flow path are provided in said surface of said substrate.

28. The chemical reactor according to claim 27, wherein the substrate is made of a material which transmits the heat from the heating section from the first reaction section to the second reaction section, and to further transmit the heat from the heating section from the second reaction section to the third reaction section.

29. The chemical reactor according to claim 22, wherein a distance between the second flow path and the heating section is shorter than a distance between the third flow path and the heating section.

30. The chemical reactor according to claim 22, wherein the third flow path is disposed on a periphery of the second flow path.

31. A chemical reactor comprising:
a first reaction section which has a first flow path, which is provided in a surface of a substrate, and in which a first reaction is caused;
a heating section which heats the first reaction section;
a second reaction section which has a second flow path, which is provided in said surface of said substrate, and in which a second reaction is caused using heat from the heating section transmitted via the first reaction section; and
at least one partition provided between the first reaction section and the second reaction section,
wherein the second flow path is disposed on a periphery of the first flow path, and
wherein the second flow path surrounds the first flow path on at least three sides.

32. A chemical reactor comprising:
a first reaction section which has a first flow path, which is provided in a surface of a substrate, and in which a first reaction is caused;
a heating section which heats the first reaction section;
a second reaction section which has a second flow path, which is provided in said surface of said substrate, and in which a second reaction is caused using heat from the heating section transmitted via the first reaction section;
at least one partition provided between the first reaction section and the second reaction section;
a third reaction section which has a third flow path in which a third reaction is caused using the heat from the heating section that is transmitted via the second reaction section; and at least one other partition which is provided between the second reaction section and the third reaction section,
wherein the third flow path is disposed on a periphery of the second flow path, and
wherein the third flow path surrounds the second flow path on at least three sides.

33. A chemical reactor comprising:
a plurality of substrates including first and second substrates laminated on each other;
a first reaction section which has a first flow path, which is provided between the first substrate and the second substrate, and in which a first reaction is caused;
a heating section which heats the first reaction section;
a second reaction section which has a second flow path, which is provided between the first substrate and the second substrate, and in which a second reaction is caused using heat from the heating section, said second reaction being caused at a temperature which is lower than a temperature at which the first reaction is caused; and
at least one partition which is provided between the first reaction section and the second reaction section,
wherein the first and second flow paths are continuous with each other between the first and second substrates.

34. The chemical reactor according to claim 33, wherein at least a part of a region between the first reaction section and the second reaction section has a thermal conductivity that is lower than a thermal conductivity of the substrates.

35. A fuel cell system comprising:
(i) a chemical reactor, which comprises:
at least two substrates laminated on each other, including two adjacent substrates laminated on each other;
a first reaction section which has a first flow path, which is provided between the two adjacent substrates, and in which a first reaction is caused;
a heating section which heats the first reaction section;
a second reaction section which has a second flow path, which is provided between the two adjacent substrates, and in which a second reaction is caused using heat from the heating section, said second reaction being caused at a temperature which is lower than a temperature at which the first reaction is caused; and
at least one partition which is provided between the first reaction section and the second reaction section,
wherein the first and second flow paths are continuous with each other between the two adjacent substrates; and
(ii) a fuel cell which generates electricity using a fuel reformed by the chemical reactor.

36. The fuel cell system according to claim 35, wherein at least a part of a region between the first reaction section and the second reaction section has a thermal conductivity that is lower than a thermal conductivity of the substrates.

* * * * *